United States Patent [19]
Inoue et al.

[11] Patent Number: 5,648,184
[45] Date of Patent: Jul. 15, 1997

[54] ELECTRODE MATERIAL FOR FLOW-THROUGH TYPE ELECTROLYTIC CELL, WHEREIN THE ELECTRODE COMPRISES CARBONACEOUS MATERIAL HAVING AT LEAST ONE GROOVE

[75] Inventors: Makoto Inoue; Masaru Kobayashi, both of Ohtsu, Japan

[73] Assignee: Toyo Boseki Kabushiki Kaisha, Osaka, Japan

[21] Appl. No.: 629,812

[22] Filed: Apr. 10, 1996

[30] Foreign Application Priority Data

Apr. 13, 1995 [JP] Japan ................... 7-088061

[51] Int. Cl.[6] .................................................. H01M 4/62
[52] U.S. Cl. ...................... 429/105; 429/34; 429/38; 429/40; 429/44; 429/101; 429/209; 429/218
[58] Field of Search .......................... 429/101, 59, 40, 429/41, 42, 44, 209, 105, 218, 34, 38

[56] References Cited

U.S. PATENT DOCUMENTS

| | | | |
|---|---|---|---|
| 4,496,637 | 1/1985 | Shimada et al. | 429/44 |
| 4,505,994 | 3/1985 | Shimada et al. | 429/101 |
| 5,384,212 | 1/1995 | Heiman et al. | 429/113 |
| 5,527,638 | 6/1996 | Kinoshita et al. | 424/101 |

*Primary Examiner*—M. Nuzzolillo
*Attorney, Agent, or Firm*—Leydig, Voit & Mayer, Ltd.

[57] ABSTRACT

An electrode material for a liquid flow-through type electrolytic cell comprising a separator interposed between a pair of collectors counter-opposing each other via a gap, and an electrode material installed in at least one of the flow paths of electrolyte solution formed between said collector and said separator, characterized by having at least one groove in a carbonaceous material sheet. According to the present invention, an electrode having less pressure loss at liquid flow, which permits easy handling, and which has high selectivity for electrochemical reaction and superior electrode activity can be obtained without impairing the fundamental property of an electrode material. The electrode material of the present invention is superior in liquid flowability and is capable of giving the electrolytic cell using this material as an electrode a high battery efficiency and a long service life.

10 Claims, 6 Drawing Sheets

ELECTRODE MATERIAL FOR FLOW-THROUGH TYPE ELECTROLYTIC CELL, WHEREIN THE ELECTRODE COMPRISES CARBONACEOUS MATERIAL HAVING AT LEAST ONE GROOVE

TECHNICAL FIELD OF THE INVENTION

The present invention relates to an electrode material for an electrolytic cell in, for example, a redox-flow type battery, particularly for vanadium redox-flow type battery, an to an electrode prepared using the same. More particularly, the present invention relates to an electrode material and an electrode which contribute to superior energy efficiency of a battery as a whole and which cause less degradation of the properties after using the battery for an extended period of time.

BACKGROUND OF THE INVENTION

To meet the rapidly increasing demand for a clean electric energy in recent years, electrolytic cells have been utilized in a growing number of fields. Typical examples of such fields are those using various types of batteries such as primary and secondary fuel batteries, and electrolytic industries such as electroplating, NaCl electrolysis and electrolytic synthesis of organic compounds. The electrodes used for these electrolytic cells include those based on electrochemical reactions of electrode itself as an active material as seen in batteries (e.g., lead batteries) and those where the electrode functions as a reaction field to allow progress of electrochemical reactions but the electrode itself does not change. The electrodes of the latter type have been mainly used for new types of secondary batteries and in electrolytic industries. Such new types of secondary batteries have been developed as batteries for storing excess electric power at the nighttime and providing same during the daytime when demand for electric power increases, thereby to level the varying demands, in consideration of ensured effective preservation of electric energy in the future, wherein typically known are zinc-chlorine batteries, zinc-bromine batteries and redox-flow type batteries. These new types of secondary batteries have been developed as back-up power sources of electric power generation system utilizing natural energies such as sunlight, wind power and wave power and as electric power sources for electric automobiles.

Figure 1:
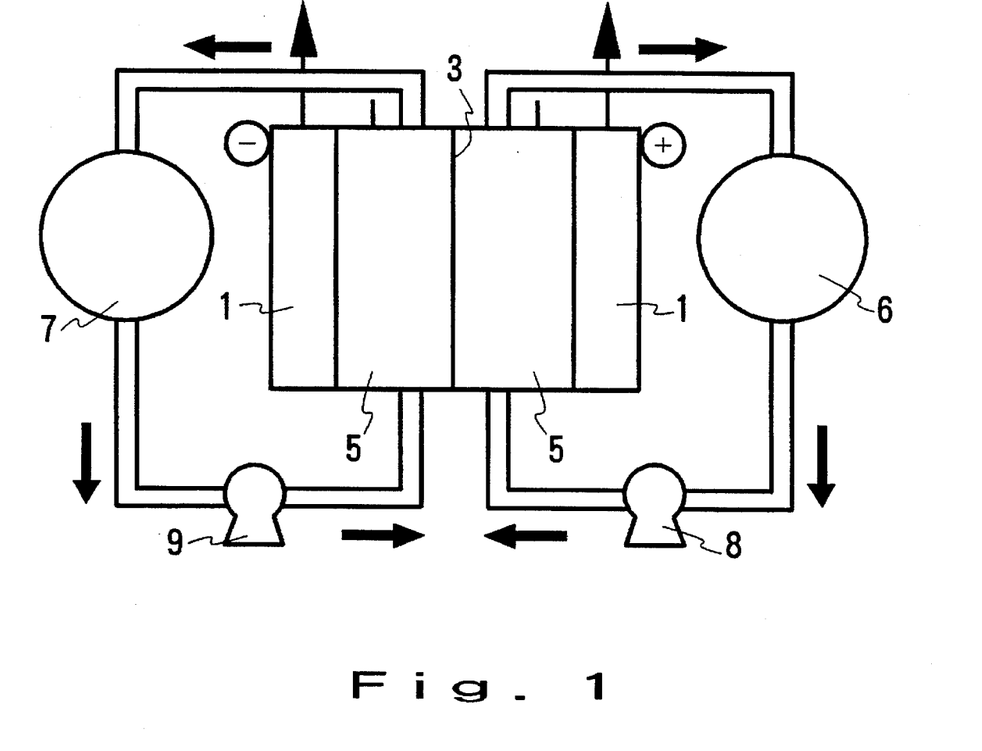
FIG. 1 is a schematic view of a battery comprising a flow-through type electrolytic cell such as a redox-flow type battery.
Figure 2:
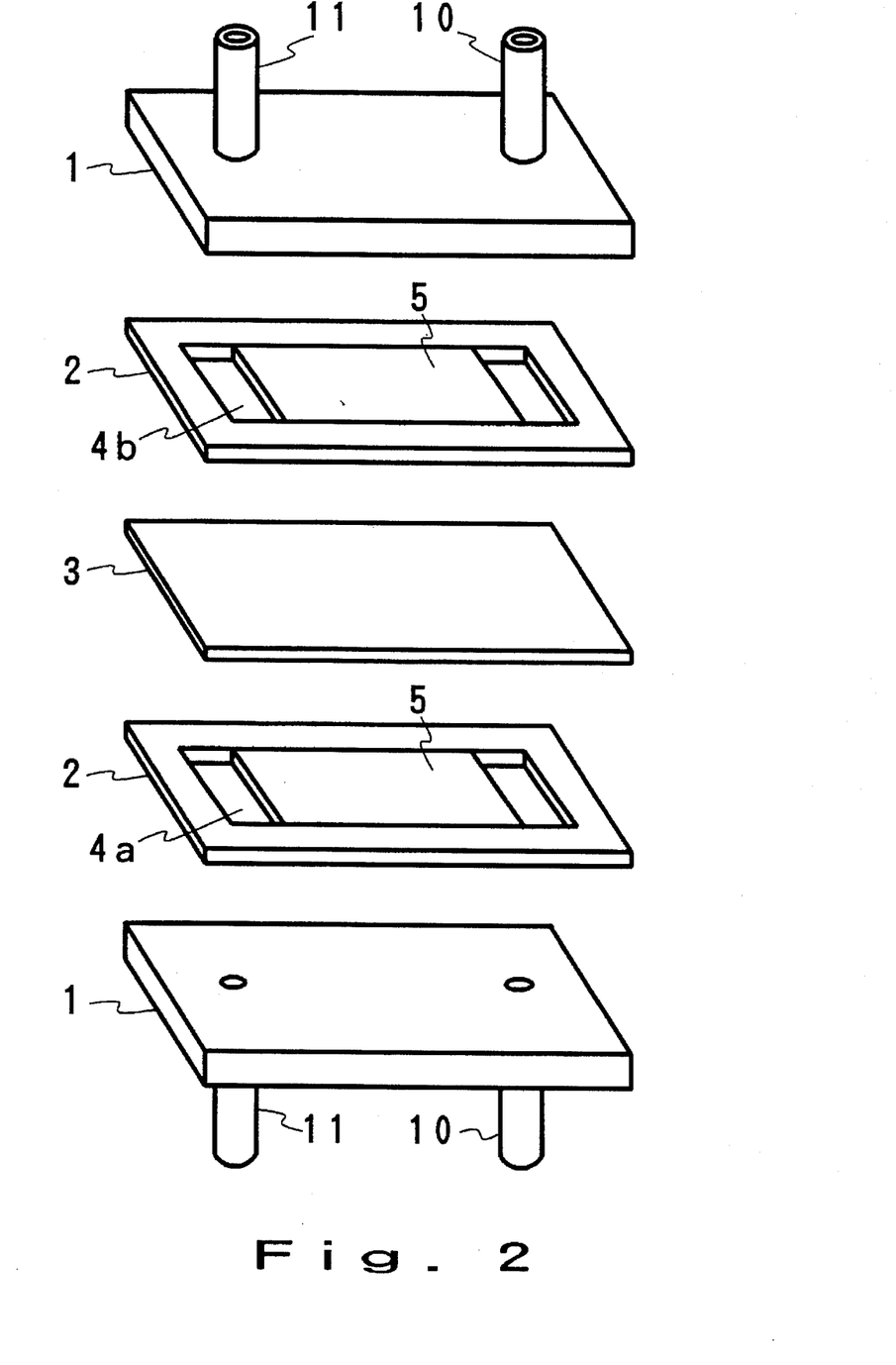
FIG. 2 is a decomposed perspective view of one embodiment of a flow-through type electrolytic cell comprising the electrode of the present invention, wherein 1 is a collector, 2 is a spacer, 3 is an ion exchange membrane (separator), 4a and 4b are flow paths, 5 is an electrode, 10 is a liquid flow inlet and 11 is a liquid flow outlet.

Of the new secondary batteries, a redox-flow type battery is superior to other batteries in reliability and economic aspect, and is one of the batteries having the highest likelihood of being put to practical use. This battery consists of an outer tank preserving an electrolyte solution and one or more electrolytic cells, wherein an electrolyte solution containing active materials is supplied from the outer tank to the electrolytic cell to allow electrochemical energy conversion, namely, charge-discharge, on the electrodes incorporated in the electrolytic cell. In general, the electrolytic cell has the liquid flow-through type structure as shown in FIG. 1, since the electrolyte solution is circulated between the outer tank and the electrolytic cell during the charge-discharge. The liquid flow-through type electrolytic cell is called a single cell, which is the minimum unit to be used alone or upon laminating with other single cells. The electrochemical reaction in the liquid flow-through type electrolytic cell is a non-uniform phase reaction on the surface of the electrode which generally accompanies a two-dimensional electrolytic reaction field. A two-dimensional electrolytic reaction field is associated with a difficulty in that the reaction amount per unit volume of the electrolytic cell is small. Then, the reaction amount per unit area, i.e., current density, is increased by a three-dimensionalization of the electrochemical reaction field. FIG. 2 shows a schematic view of the liquid flow-through type electrolytic cell having a three-dimensional electrode.

The electrolytic cell shown in FIG. 2 includes two counter-opposing collectors 1, an ion exchange membrane (separator) 3 between said collectors, and spacers 2 at both sides of the ion exchange membrane 3, which spacers forming flow paths 4a and 4b of electrolyte solution along the collectors 1. An electrode 5 of carbonaceous fiber assembly is installed in at least one of said flow paths 4a and 4b. In this way, a three-dimensional electrode is formed.

In the case of a redox-flow type battery using an acidic aqueous solution of hydrochloric acid containing iron chloride as a positive electrode electrolyte solution and an acidic aqueous solution of hydrochloric acid containing chromium chloride as a negative electrode electrolyte solution, for example, an electrolyte solution containing chromium bivalent ion $Cr^{2+}$ is supplied through the liquid flow path 4a on the negative electrode side, and an electrolyte solution containing iron trivalent ion $Fe^{3+}$ is supplied through the liquid flow path 4b on the positive electrode side during discharge. In the liquid flow path 4a on the negative electrode side, $Cr^{2+}$ releases electrons in the three-dimensional electrode 5 and is oxidized into chromium trivalent ion $Cr^{3+}$. The released electrons reduce $Fe^{3+}$ to iron bivalent ion $Fe^{2+}$ in the three-dimensional electrode 5 on the positive electrode side, after passing through an outer circuit.

The oxidation-reduction during discharge causes insufficient amount of chlorine ion $Cl^-$ in the negative electrode electrolyte solution and excessive $Cl^-$ in the positive electrode electrolyte solution, which imbalance is resolved by the migration of $Cl^-$ through the ion exchange membrane 3 from the positive electrode side to the negative electrode side, thereby achieving a charge balance. Alternatively, hydrogen ion $H^+$ may migrate through the ion exchange membrane 3 from the negative electrode side to the positive electrode side, thereby also achieving a charge balance. Most iron/chromium redox-flow type batteries use a cation exchange membrane as the ion exchange membrane which balances the charge by the migration of $H^+$. In addition, the use of an aqueous solution of sulfuric acid containing vanadium, which has a high electromotive force, in recent years has enabled to achieve the high energy density of the battery.

With respect to the liquid flow-through type electrolytic cell, electrodes have been intensively developed, since they are responsible for, for example, the properties of batteries. The electrode which is not an active material itself but functions as a reaction field for promoting the electrochemical reactions of active materials permits application of various materials, in which carbonaceous materials are frequently used in view of electro-conductivity and chemical resistance. In particular, a carbonaceous fiber assembly which is chemically resistant, electro-conductive and liquid-permeating has been used for the electrode of redox-flow type batteries which have been intensively developed for storing electric power.

As the electrode material to be used for such liquid flow-through type batteries, for example, Japanese Patent Unexamined Publication No. 119680/1984 proposes a knit fabric made from carbonaceous fibers. Japanese Patent Unexamined Publication No. 200467/1988 proposes a carbon electrode material of a textile fabric consisting of a thick yarn of No. 5 count or above and a yarn thinner than this in the direction crossing therewith. Japanese Patent Unexamined Publication No. 234612/1994 proposes the use of a nonwoven fabric as the texture.

The liquid flow-through type electrolytic cell having a three-dimensional electrode prepared using such porous electrode material is inevitably subject to liquid flow-through pressure loss due to the electrode material in the electrode. An electrolyte solution is supplied to an electrode with a pump, and a liquid flow-through pressure loss in the electrode causes increase in energy consumption for running a pump to ultimately decrease the total battery energy efficiency. In the case where a porous electrode material comprising a three-dimensional electrode has the same density, the liquid flow-through pressure loss can be decreased by thickening the porous electrode material comprising the three-dimensional electrode, which leads to the reduction of the load on the pump. However, a thicker three-dimensional electrode requires greater amounts of an electrode material to be used, which in turn raises the total production cost of the battery. To avoid such high production cost, Japanese Patent Unexamined Publication No. 200467/1988 proposes a carbon electrode material of a textile fabric consisting of a thick yarn of No. 5 count or above and a yarn thinner than this in the direction crossing therewith. This electrode material gives difficulty in handling as exemplified by slipping or dropping of the thick yarn and/or the thin yarn forming the electrode material, and unachievable cutting into a predetermined size with precision, which is due to the instable shape of the fabric.

Vanadium has been used for a new redox-flow type secondary battery besides Fe/Cr, as mentioned earlier. The oxidative reduction of vanadium ion in the electrode comprising a carbonaceous fiber assembly in said battery is 10 times or more faster than that of chromium ion conventionally used as the negative electrode active material of redox-flow type batteries. The absence of electrolyte solution flow inside the electrode material according to a method called "flow by" wherein an electrolyte solution is flown through the space between a carbonaceous fiber assembly (electrode material) connected to a collector, and a separator results in an electrode reaction which occurs only in the region facing said space. As a result, the battery is insufficient in that the voltage efficiency is low, thus failing to advantageously utilize the accelerated reaction speed.

An attempt to solve this problem by flowing the electrolyte solution inside the fiber assembly (electrode material) increases the pressure loss during the liquid flow, due to the viscosity of the electrolyte solution. In addition, an increase in the flow-through liquid amount to increase the output electric energy per unit time and unit area causes greater pressure loss.

SUMMARY OF THE INVENTION

It is therefore an object of the present invention is to provide an electrode material having a small liquid flow-through pressure loss when flowing the liquid, and having superior handling property, while retaining the fundamental properties of the electrode material.

Another object of the present invention is to provide an electrode for an electrolytic cell, which suffers less from chemical change after repetitive charge-discharge, which is capable of the same electrode reaction as in the initial stage of the service life, (i.e., the electrode has a long service life), and which contributes to an enhanced overall efficiency of a battery.

The present invention provides an electrode material for a flow-through type electrolytic cell comprising a separator set between a pair of collectors counter-opposing each other via a gap, and an electrode set at least in one of the electrolyte solution flow paths formed between said collector and the separator, characterized by having at least one groove in a carbonaceous fiber sheet, and an electrode prepared therefrom.

BRIEF DESCRIPTION OF THE DRAWINGS

As shown in FIG. 1, 6 is a positive electrode solution tank, 7 is a negative electrode solution tank, 8 and 9 are liquid supply pumps.

FIGS. 3(a), 3(b) and 3(c) are schematic perspective views of the electrode material having grooves of the present invention, wherein FIG. 3(a) is an electrode having convex grooves, FIG. 3(b) is an electrode having semicircle grooves, and FIG. 3(c) is an electrode having V-shaped grooves, $t_M$ is the depth of the groove, and $D_M$ is the width of the groove.

DETAILED DESCRIPTION OF THE INVENTION

The electrode material of the present invention is particularly preferably prepared from a flame-resistant fiber obtained by imparting, by a conventional method, flame resistance to a known polyacrylonitrile fiber. In addition, any fiber capable of being carbonized can be used, such as precursor fibers, cellulose fibers and cured novolak fibers having isotropic pitch or mesophase pitch. Such fibers are prepared into a sheet by a known method, which may be, for example, a method for preparing a nonwoven fabric. A nonwoven fabric is prepared by, for example, by carding and subjecting the multi-layered web to a needle punch treatment. For easy grooving, multiple layers of the web of the above-mentioned fiber material are laminated, or the above-mentioned different fiber materials are mixed and prepared into a web which is to be processed into a nonwoven cloth.

Examples of the carbonaceous fiber material to form the electrode of the present invention include, but not limited to, a sheet prepared from fibers such as spun yarns and filament bundling yarns wherein said sheet is exemplified by nonwoven fabric, knit fabric, woven fabric and special textile fabric disclosed in Japanese Patent Unexamined Publication No. 200467/1988, and a sheet prepared from, for example, carbonaceous fiber assembly composed of mixed fabric thereof, porous carbon material, carbon-carbon composite and carbon particles.

The electrode of the present invention is interposed between a separator and a collector. While the electrode may not be substantially compressed, the electrode is preferably compressed by the separator and the collector, so that collecting efficiency can be improved.

The basis weight of the electrode material of the present invention varies depending on the texture. When the thickness of the spacer 2 in FIG. 2 sandwiched between the separator and the collector is 1–3 mm, the basis weight is preferably 50–500 g/m², more preferably 100–400 g/m². It is preferable that the thickness of the carbon electrode material be at least greater than the thickness of the spacer 2 in FIG. 2, which is 1.5–3 times greater than the thickness of the spacer when a material having a low density such as nonwoven fabric is used. The groove in the electrode material may be set to face the ion exchange membrane located in the middle of the electrolytic cell, or may face the collector. The groove needs to be in parallel with the liquid flow direction on the electrode.

FIGS. 4–8 show cross-sectional views in the direction perpendicular to the liquid flow direction on the carbonaceous fiber sheet sandwiched between a separator and a collector and compressed.

The structure of carbon is desirably as described in Japanese Patent Unexamined Publication No. 234612/1994 wherein the carbon has a quasi-graphite crystalline structure of not more than 0.370 nm of average <002> spacing and average crystal size of not less than 0.90 nm as measured by an X-ray wide angle scattering analysis, for an improved current efficiency and improved voltage efficiency.

Figure 3:
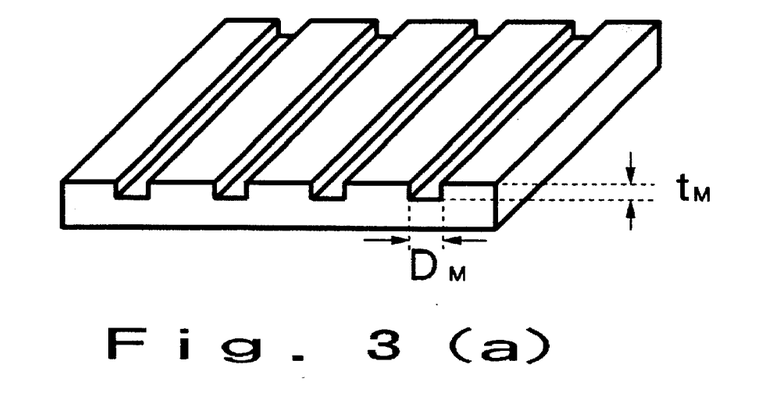
Figure 4:
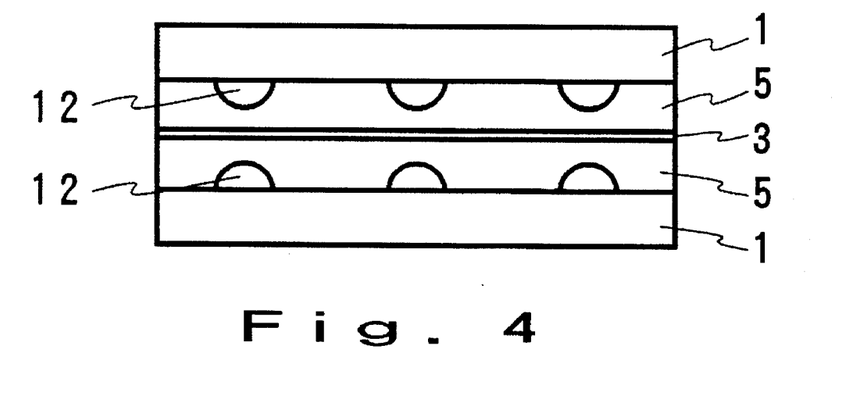
FIGS. 4–8 are cross-sectional views of the carbonaceous fiber sheet in the direction perpendicular to the liquid flow direction, which is interposed between the separator and the collector, wherein 12 is a groove passage and other symbols are as defined in FIG. 2.
Figure 5:
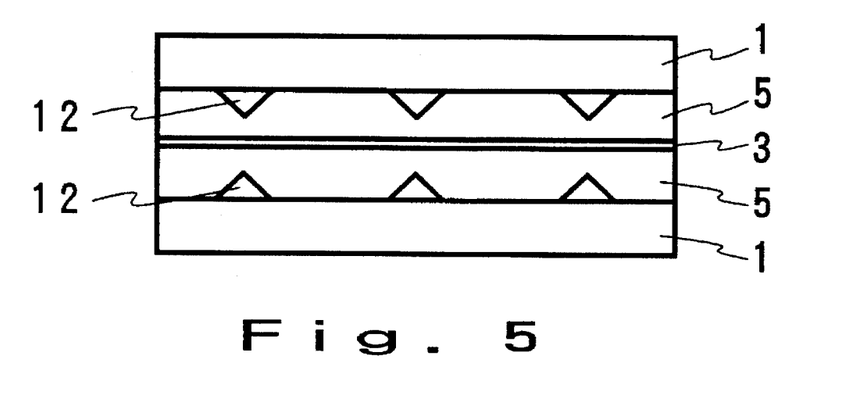
Figure 6:
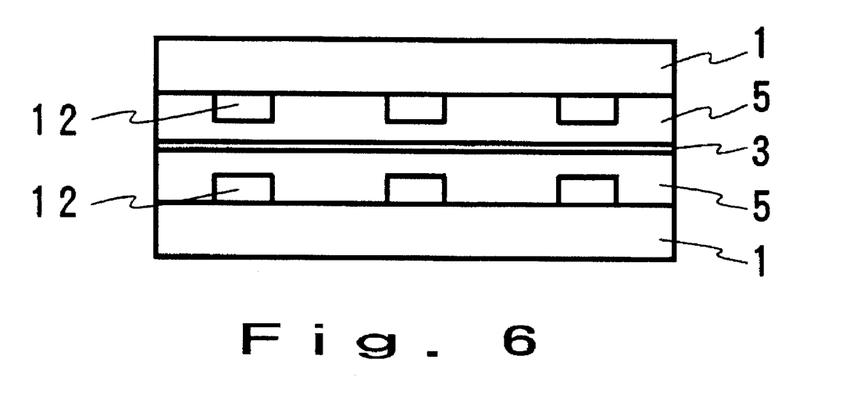
Figure 7:
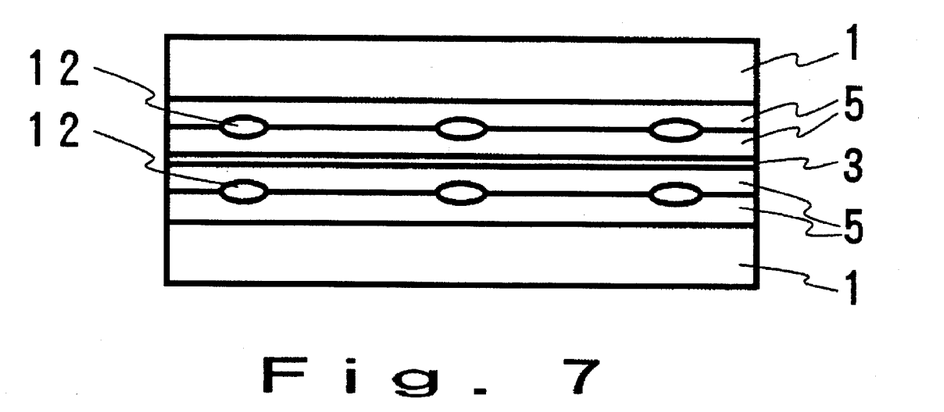
Figure 8:
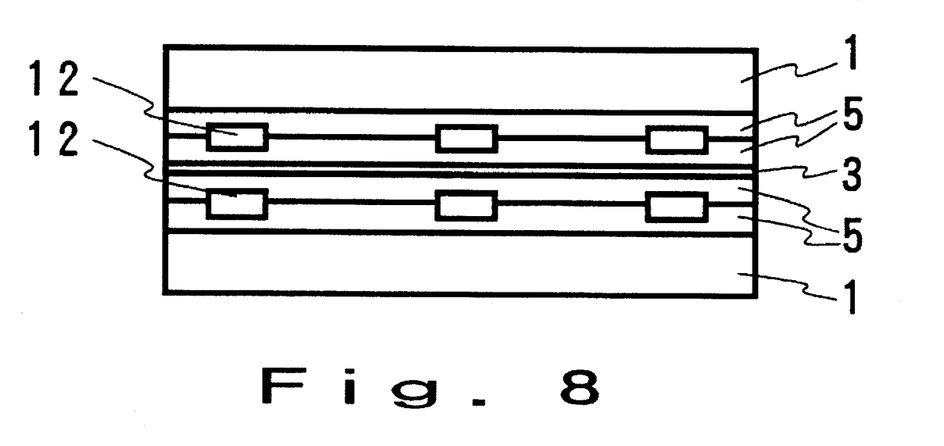

The method for forming a groove in the electrode material of the present invention includes placing a mold having a predetermined mountain width, distance between mountains and height thereof on the above-mentioned sheet, and pressing at 100°–180° C. for 10 seconds to 5 minutes. The perspective schematic views of the electrode material of the present invention are shown in FIG. 3(a)–FIG. 3(c). The shape of the groove is semicircle [FIG. 3(a)], V-shaped [FIG. 3(c)] or convex [FIG. 3(b)]. The method for forming a groove includes, besides this method, cutting a groove with a sharp cutter, line embossing, stitch bonding of line and the like, which may be otherwise as long as a groove can be formed in the sheet. A sheet in which a groove cannot be formed with ease may be adhered to another sheet having a groove formed in advance.

The sheet with a groove is carbonized in an inert atmosphere at 800°–2,500° C. to impart electro-conductivity. After carbonization, the sheet undergoes surface oxidation at 500°–1,000° C. in the air for improving the wettability with the electrolyte solution, as mentioned above.

In the carbonaceous electrode material of the present invention, the total cross-sectional area of the groove in the electrode material is desirably 1 to 80% relative to the product of the thickness and the width of the electrode material. When the total sectional area falls within said range, the groove for liquid flow is large enough to obviate an increase in the liquid flow pressure loss. The depth ($t_M$) of the groove in the carbon electrode material of the present invention is preferably at least not less than 20% of the thickness of the electrode material. When the depth is not less than 20%, the groove is free of an increase in the liquid flow pressure loss caused by disappearance of the effective groove when fabricating a electrolytic cell. The number of the groove is at least one, preferably two or more. The width ($D_M$) of one groove is preferably ½–5 times greater than the depth ($t_M$) of the groove, and the product of the groove width and the number of the groove is preferably not more than 80% of the width of the liquid flow path. When the groove width ($D_M$) is not less than ½ of the depth ($t_M$) of the groove, the liquid flow pressure loss does not increase due to the surface tension of the electrolyte solution, whereas that of not more than 5 times greater does not cause deformation of the groove at fabrication of an electrolytic cell, thus successfully retaining stable groove shape, which in turn advantageously results in smaller pressure loss. When the total groove width relative to the width of the electrode material becomes not more than 80%, the liquid flow pressure loss decreases. The number of the groove per one sheet of the electrode material when used in an electrolytic cell is preferably plural, since a decrease in the liquid flow pressure loss is aimed by securing a number of flow paths of electrolyte solution by forming grooves, wherein the total cross-sectional area of the grooves in the electrode material is desirably set to not less than 1% and not more than 80% relative to the product of the thickness and the width of the electrode material, as mentioned above. The total cross-sectional area (SMn) of the groove in the electrode material is calculated by multiplying the sectional area (M) of one groove and the number (n) of the groove.

Figure 9:
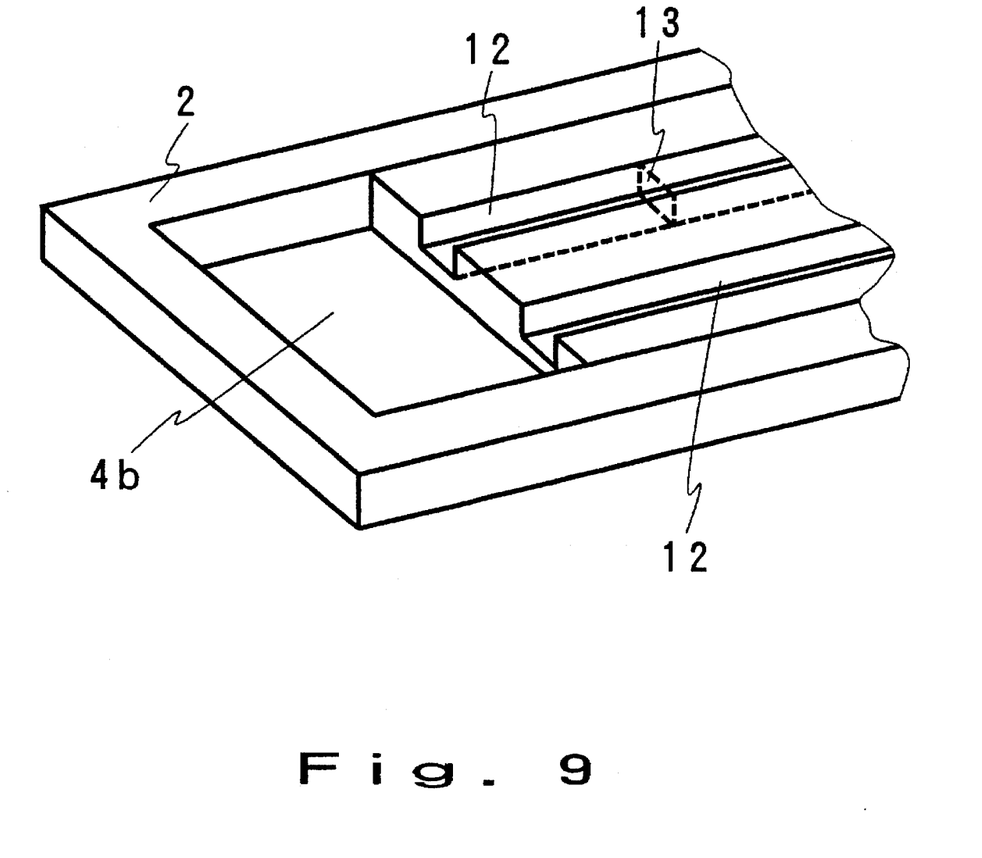
FIG. 9 is a perspective view showing the cross-sectional area of the groove passage, which is referenced by 13.

The liquid flowability is generally improved by decreasing the density of the sheet. However, automatic decrease in the density causes noticeable decrease in voltage efficiency, since an electrolyte solution is flown along the side of the electrode, as mentioned above. A flow path having a certain size can have markedly improved liquid flowability without impairing the reactivity on the electrode surface, even if the electrolyte solution flows at varying speeds. This is accomplished without degrading the electrode performance when a groove passage preferably having a length of at least 0.3 mm, more preferably 0.5–1.5 mm, in the thickness direction of the carbonaceous fiber sheet and a cross-sectional area (see FIG. 9 wherein 13 is a cross-sectional area of the groove) of from 0.3 mm² to 5 mm², more preferably 1–5 mm², in the direction perpendicular to the liquid flow direction, is formed when the electrode material is set between a separator and a collector in a compressed manner. Such groove passage can be formed by cutting the carbonaceous fiber sheet with a cutter having a certain shape or may be formed in the gap between twisted yarns. It is also possible to form such groove passage with ease by making a groove in a flame-resistant (infusible) fiber sheet by heat pressing.

The properties of the electrode for electrolytic cell of, for example, new type of secondary batteries is defined mainly by current efficiency $\eta I$, voltage efficiency $\eta V$ (cell resistance R), energy efficiency $\eta E$ (product of $\eta I$ and $\eta V$), and stability (life) of these efficiencies during charge-discharge cycle and liquid flow pressure loss.

Particularly in redox-flow type batteries, the current efficiency $\eta I$ becomes low due to the partial consumption of the charged electric quantity by side reactions at charging, such as generation of hydrogen and oxygen. In general, when metallic elements are used to form an electrode, each element shows a selectivity for an electrochemical reaction which is not consistent among the elements used. It is also considered that different crystallinity of carbon leads to different electron energy level corresponding thereto, which in turn is responsible for the selectivity for electrochemical reaction, i.e., current efficiency $\eta I$. The electrode material of the present invention can greatly increase the current efficiency $\eta I$ and suppress an increase in cell resistance due to charge-discharge cycles. This is considered to be attributable to the reaction selectivity based on the electron energy level of the carbonaceous material of the above-mentioned structure, which is most suitable for the system in which the material is to be used, a homogeneous (averaged) internal structure of the carbon, and uniform electrode potential due to the reduction or absence of structural drawback. Metallic impurities, in particular, transition metals (e.g. iron, chromium and nickel) are known to act as a catalyst which promotes side reaction, and it is important to use a carbon material containing the least possible amount of such impurities.

A groove passage preferably having a length of at least 0.3 mm in the thickness direction of the carbonaceous fiber sheet and a cross-sectional area of from 0.3 mm² to 5 mm² in the direction perpendicular to the liquid flow direction through the electrode compressed between a separator and a collector, can improve the liquid flowability without degrading the properties of the electrode.

The groove passage preferably has a length of 0.5 mm–1.5 mm and a cross-sectional area of 1 mm²–5 mm². The shape of the groove may be any, such as a circle, a semicircle, a square, a rectangle and a trapezoid. A groove passage formed on the side which comes into contact with the collector is desirable to secure stable existence of the groove passage while the electrode material is set in the cell and a liquid is flowing.

The basis weight of the electrode material, thickness of the electrode material, depth of the groove, width of the groove, distance between grooves, liquid flow pressure loss, handling property, length of groove passage, cross-sectional area of groove passage and electrode performance in the present invention are determined according to the following methods.

(1) Basis weight (W)

A 10 cm square (size a) sample to be used for the determination of liquid flow pressure loss is dried at 100° C. for one hour, cooled in a desiccator and weighed on an electron balance (weight w'). The basis weight is calculated by the following equation (1):

$$W = w'/a^2 \qquad (1)$$

(2) Thickness of electrode material

The thickness of the electrode material without a groove is measured with a thickness meter (Peacock) set to load 180 g/cm² and the figure is read to the first decimal place. The unit is millimeter.

(3) Depth of groove

The distance between the bottom of the groove and the lower end of the electrode material in the thickness direction is measured with a Digimatic Caliper (series 500) manufactured by Mitsutoyo Kabushiki Kaisha and the figure is read to the first decimal place. The difference between the thickness of the electrode material of (2) and this value is taken as the depth of the groove (unit: millimeter).

(4) Width of groove

The width of the groove is measured with the Digimatic Caliper (series 500) and the figure is read to the first decimal place (unit: millimeter).

(5) Distance between grooves

The distance between the centers of adjacent grooves is measured with the Digimatic Caliper (series 500) and the figure is read to the first decimal place (unit: millimeter).

(6) Liquid flow pressure loss

A liquid flow-through type electrolytic cell having the shape shown in FIG. 2 and the size of 20 cm in the liquid flow direction, 10 cm in the width (flow path width) direction, and 2.5 mm spacer 2 is prepared, and electrodes which are cut into 10 cm square each are installed. An ion exchange water is flown at a rate of 10 liter/hour and the liquid flow pressure change at the inlet and outlet of the electrolytic cell is determined. As a blank, a similar determination is conducted using the system without an electrode material, and the difference between the difference in the determined values and that in the blank values is taken as the liquid flow pressure loss.

(7) Handling property

Electrode materials easily set into an electrolytic cell are evaluated as ○ and those requiring handling care to prevent falling or deformation are evaluated as X.

(8) Length and cross-sectional area of groove passage (a) Length

A carbonaceous fiber sheet is set in a spacer having a predetermined thickness, and the cross section in the width direction of the groove passage is taken by a polaroid camera. The photograph is enlarged 2.8 times and the maximum length of the groove passage in the thickness direction of the carbonaceous fiber sheet is measured with the Digimatic Caliper (series 500) and the figure is read to the digit of 0.1 min. The reading is amended by multiplying 1/2.8 and shown by the number of effective digits.

(b) Cross-sectional area

The groove passage may have various sectional shape such as a circle, a semicircle, a triangle, a square, a rectangle and a trapezoid. When the groove is compressed, the cross section of the passage tends to have a rectangular, circular arc or oval shape. Approximately, the cross-sectional is considered a rectangle, and the area of the cross section is calculated by multiplying the maximum length of the passage in the thickness direction of the carbonaceous fiber sheet, and the maximum length of the passage in the direction perpendicular to said thickness direction. The maximum length in the perpendicular direction is read in the same manner as in the reading of the above-mentioned maximum length of the passage in the thickness direction, and shown by the number of effective digits.

(9) Electrode performance

A small size cell having 10 cm² of electrode area, 10 cm of longitudinal length (liquid flow direction) and 10 cm of width is manufactured and repeatedly charged and discharged at a constant current density to test for electrode performance. As the positive electrode electrolyte solution, a 5M aqueous sulfuric acid solution containing 1 mol/liter vanadium oxysulfate is used. A 5M aqueous sulfuric acid solution containing 1 mol/liter vanadium sulfate is used as the negative electrode electrolyte solution. The electrolyte solutions are used in large excess relative to that for cell and pipeline. The liquid flow rate is 62 ml per minute and the determination is performed at 40° C.

(a) Current efficiency ηI

In a test of one cycle which starts at charging and finishes at discharging wherein current density is set to 80 mA/cm² (8A) per geometrical area of the electrode, the current efficiency ηI is determined by the following equation (3) in which Q1 (Coulomb) is the quantity of electricity required for charging to 1.7 V, Q2 (Coulomb) is the quantity of electricity taken out for constant current discharging to 1.0 V and Q3 (Coulomb) is the quantity of electricity taken out for subsequent constant potential discharging at 1.2 V.

$$\eta 1\ (\%) = \frac{Q2 + Q3}{Q1} \times 100 \qquad (3)$$

(b) Cell resistance R

The charging ratio is calculated by the following equation (4) which is the proportion of the quantity of the electricity taken out by discharging as mentioned in (a), relative to the theoretical quantity (Qth) of electricity required to reduce $V^{3+}$ to $V^{2+}$ thoroughly in the negative electrode electrolyte solution.

$$\text{Charging ratio (\%)} = \frac{Q2 + Q3}{Qth} \times 100 \qquad (4)$$

in which Q2 and Q3 are as defined in (a).

Cell resistance ($\Omega$ cm$^2$) to the geometrical area of the electrode is determined from the slope of a current-voltage curve when the charging rate is 50%.

(c) Time-course changes of charge-discharge cycle

After the determination of (a) and (b), charge-discharge is repeated using the same cell at the constant current density of 80 mA/cm$^2$ within the cell voltage of 1.0–1.7 V. After the predetermined repeats of the cycles, (a) and (b) are measured to determine $\eta I$ and R.

(d) Liquid flow pressure loss

A mercury manometer is equipped at the inlet and outlet of a small size cell such as that used for the determination of electrode performance (a)–(c) above, and the pressure change upon liquid flow is measured. An ion exchange water is used as the flowing liquid. As a blank, a similar determination is conducted using the system without a carbonaceous fiber sheet, and the difference between the difference in the determined values and that in the blank value is taken as the liquid flow pressure loss $\Delta P$ (mmHg) of the electrode.

The present invention is explained in the following by way of Examples and Comparative Examples.

EXAMPLE 1

Polyacrylonitrile (PAN) fiber having an average fiber size of 16 μm was made flame-resistant in the air at 250° C. The obtained flame-resistant short fiber was felted to give a non-woven fabric having a basis weight of 470 g/m$^2$ and a thickness of 4.5 min. The nonwoven fabric was cut into a 13 cm square piece, and an aluminum mold (15 cm square) having one convex mountain of width 2.0 mm, height 20 mm and length 15 cm was placed on the fabric in such a manner that the mountain faces the fabric, which was then set in a heat press apparatus having a cylinder size of 160 mm and pressed at 150° C., pressure 1 kg/cm$^2$ for 2 minutes to give a flame-resistant nonwoven fabric with a groove.

The obtained fabric was placed in an inert gas, the temperature of which was raised to 1250° C. at an elevating rate of 10° C./min, kept at said temperature for one hour for carbonization and cooled to give a carbonized product. This product was oxidized in the air at 650° C. to the yield by weight of 93% to give a carbonaceous fiber nonwoven fabric with a groove having a <002> spacing of 3.55 Å and crystal size in the direction of C axis of 16.0 Å.

The basis weight of the fabric, thickness of the fabric, depth of the groove, width of the groove, ratio of groove depth, cross-sectional area of the groove, liquid flow pressure loss and handling property are shown in Table 1.

EXAMPLE 2

Polyacrylonitrile (PAN) fiber having an average fiber size of 16 μm was made flame-resistant in the air at 250° C. The obtained flame-resistant short fiber was felted to give a nonwoven fabric having a basis weight of 470 g/m$^2$ and a thickness of 4.5 min. The nonwoven fabric was cut into a 13 cm square piece, and an aluminum mold (15 cm square) having two convex mountains of width 2.0 mm, distance between mountains 60 mm, height 20 mm and length 15 cm was placed on the fabric in such a manner that the mountains face the fabric, which was then set in a heat press apparatus having a cylinder size of 160 mm, and pressed at 150° C., pressure 1 kg/cm$^2$ for 2 minutes to give a flame-resistant nonwoven fabric with grooves.

The obtained fabric was placed in an inert gas, the temperature of which was raised to 1250° C. at an elevating rate of 10° C./min, kept at said temperature for one hour for carbonization and cooled to give a carbonized product. This product was oxidized in the air at 650° C. to the yield by weight of 93% to give a carbonaceous fiber nonwoven fabric with grooves.

The basis weight of the fabric, thickness of the fabric, depth of the groove, width of the groove, distance between grooves, ratio of groove depth, cross-sectional area of the groove, ratio of cross-sectional area of the groove, liquid flow pressure loss and handling property are shown in Table 1.

EXAMPLE 3

Polyacrylonitrile (PAN) fiber having an average fiber size of 16 μm was made flame-resistant in the air at 250° C. The obtained flame-resistant short fiber was felted to give a nonwoven fabric having a basis weight of 470 g/m$^2$ and a thickness of 4.5 mm. The nonwoven fabric was cut into a 13 cm square piece, and an aluminum mold (15 cm square) having three convex mountains of width 2.0 mm, distance between mountains 40 mm, height 20 mm and length 15 cm was placed on the fabric in such a manner that the mountains face the fabric, which was then set in a heat press apparatus having a cylinder size of 160 mm, and pressed at 150° C., pressure 1 kg/cm$^2$ for 2 minutes to give a flame-resistant nonwoven fabric with grooves.

The obtained fabric was placed in an inert gas, the temperature of which was raised to 1250° C. at an elevating rate of 10° C./min, kept at said temperature for one hour for carbonization and cooled to give a carbonized product. This product was oxidized in the air at 650° C. to the yield by weight of 93% to give a carbonaceous fiber nonwoven fabric with grooves.

The basis weight of the fabric, thickness of the fabric, depth of the groove, width of the groove, distance between grooves, ratio of groove depth, cross-sectional area of the groove, ratio of cross-sectional area of the groove, liquid flow pressure loss and handling property are shown in Table 1.

EXAMPLE 4

Polyacrylonitrile (PAN) fiber having an average fiber size of 16 μm was made flame-resistant in the air at 250° C. The obtained flame-resistant short fiber was felted to give a nonwoven fabric having a basis weight of 470 g/m$^2$ and a thickness of 4.5 mm. The nonwoven fabric was cut into a 13 cm square piece, and an aluminum mold (15 cm square) having one convex mountain of width 3.0 mm, height 20 mm and length 15 cm was placed on the fabric in such a manner that the mountain faces the fabric, which was then set in a heat press apparatus having a cylinder size of 160 mm, and pressed at 150° C., pressure 1 kg/cm$^2$ for 2 minutes to give a flame-resistant nonwoven fabric with a groove.

The obtained fabric was placed in an inert gas, the temperature of which was raised to 1250° C. at an elevating rate of 10° C./min, kept at said temperature for one hour for carbonization and cooled to give a carbonized product. This product was oxidized in the air at 650° C. to the yield by weight of 93% to give a carbonaceous fiber nonwoven fabric with a groove.

The basis weight of the fiber, thickness of the fiber, depth of the groove, width of the groove, ratio of groove depth, cross-sectional area of the groove, ratio of cross-sectional area of the groove, liquid flow pressure loss and handling property are shown in Table 1.

EXAMPLE 5

Polyacrylonitrile (PAN) fiber having an average fiber size of 16 μm was made flame-resistant in the air at 250° C. The obtained flame-resistant short fiber was felted to give a nonwoven fabric having a basis weight of 470 g/m² and a thickness of 4.5 mm. The nonwoven fabric was cut into a 13 cm square piece, and a 1 cm wide, 3.0 mm thick spacer was placed therearound, on which an aluminum mold (15 cm square) having two concave mountains of width 2.0 mm, distance between mountains 60 mm and height 20 mm was placed on the fabric in such a manner that the mountains face the fabric. The obtained pair of fiber and mold was set in a heat press apparatus having a cylinder size of 160 mm, and pressed at 150° C., pressure 1 kg/cm² for 2 minutes to give a flame-resistant nonwoven fabric with grooves.

The obtained fabric was placed in an inert gas, the temperature of which was raised to 1250° C. at an elevating rate of 10° C./min, kept at said temperature for one hour for carbonization and cooled to give a carbonized product. This product was oxidized in the air at 650° C. to the yield by weight of 93% to give a carbonaceous fiber nonwoven fabric with grooves.

The basis weight of the fiber, thickness of the fiber, depth of the groove, width of the groove, distance between grooves, ratio of groove depth, cross-sectional area of the groove, ratio of cross-sectional area of the groove, liquid flow pressure loss and handling property are shown in Table 1.

EXAMPLE 6

Polyacrylonitrile fiber having an average fiber size of 16 μm was made flame-resistant in the air at 250° C. The obtained flame-resistant short fiber was felted to give a nonwoven fabric having a basis weight of 470 g/m². The nonwoven fabric was cut into a 13 cm square piece, and passed through a 200 mm wide line emboss roller having four convex mountains of width 3.0 mm, distance between mountains 30 mm and height 10 mm under the conditions of temperature 150° C., roll gap 1.0 mm and delivery rate 1 m/min to give a flame-resistant nonwoven fabric with grooves.

The obtained fabric was cut into a 13 cm square piece having four grooves and placed in an inert gas, the temperature of which was raised to 1250° C. at an elevating rate of 10° C./min, kept at said temperature for one hour for carbonization and cooled to give a carbonized product. This product was oxidized in the air at 650° C. to the yield by weight of 93% to give a carbonaceous fiber nonwoven fabric with grooves.

The basis weight of the fiber, thickness of the fiber, depth of the groove, width of the groove, distance between grooves, ratio of groove depth, cross-sectional area of the groove, ratio of cross-sectional area of the groove, liquid flow pressure loss and handling property are shown in Table 1.

COMPARATIVE EXAMPLE 1

Polyacrylonitrile fiber having an average fiber size of 16 μm was made flame-resistant in the air at 250° C. The obtained flame-resistant short fiber was felted to give a nonwoven fabric having a basis weight of 470 g/m². The nonwoven fabric was placed in an inert gas, the temperature of which was raised to 1250° C. at an elevating rate of 10° C./min, kept at said temperature for one hour for carbonization and cooled to give a carbonized product. This product was oxidized in the air at 650° C. to the yield by weight of 93% to give a carbonaceous fiber nonwoven fabric. The basis weight of the fiber, thickness of the fiber, liquid flow pressure loss and handling property are shown in Table 1.

COMPARATIVE EXAMPLE 2

Spun yarns of 1.8 meter count were manufactured using reproduced cellulose fibers of 2.0 denier (single fiber) and three spun yarns were twisted to give a thicker twisted yarn of 0.6 meter count. Spun yarns of 2.3 meter count were manufactured using reproduced cellulose fibers having the same fineness as above and used as the thin yarn. The thin yarn as a warp yarn and the thick yarn as a woof yarn were woven into a plain weave at a warp yarn density of 7.9 yarns/cm and a woof yarn density of 1.97 yarns/cm. The woven fabric was placed in an inert gas, the temperature of which was raised from room temperature to 270° C. over 3 hours. After keeping the fabric for one hour, the temperature was raised to 2000° C. over 3 hours at an elevating rate of 400° C./h, and the fabric was kept for 30 minutes for carbonization. After cooling, the fabric was taken out, heated to 700° C. in the air, treated for 4 minutes to give a carbonaceous fiber woven fabric. The liquid flow pressure loss of this fabric was determined using two sheets thereof overlapped. The basis weight of the fabric, thickness of the fabric, liquid flow pressure loss and handling property are shown in Table 1.

TABLE 1

|  | groove width (mm) | number of groove (/100 mm) | thickness (mm) | groove distance (mm) | groove depth (mm) | basis weight (g/m²) | groove depth ratio (%) | groove sectional area (mm²) | groove sectional area ratio (%) | liquid flow pressure loss (mmHg) | handling property |
|---|---|---|---|---|---|---|---|---|---|---|---|
| Ex. 1 | 1.7 | 1 | 4.5 | — | 2.7 | 343 | 60.0 | 4.59 | 1.02 | 62 | ○ |
| Ex. 2 | 1.7 | 2 | 4.5 | 55 | 2.7 | 342 | 60.0 | 9.18 | 2.04 | 40 | ○ |
| Ex. 3 | 1.7 | 3 | 4.3 | 35 | 2.5 | 343 | 58.1 | 12.75 | 2.97 | 40 | ○ |
| Ex. 4 | 2.6 | 1 | 4.7 | — | 2.4 | 386 | 51.1 | 6.24 | 1.33 | 64 | ○ |
| Ex. 5 | 1.7 | 2 | 4.7 | 55 | 1.5 | 343 | 31.9 | 5.10 | 1.09 | 61 | ○ |
| Ex. 6 | 2.6 | 4 | 4.4 | 26 | 2.2 | 344 | 50.0 | 22.88 | 5.20 | 40 | ○ |
| Com.Ex.1 | 0 | 0 | 4.5 | — | 0 | 350 | 0 | 0 | 0 | 81 | ○ |
| Com.Ex.2 | — | — | 2.2 | — | — | 352 | — | — | — | 68 | X |

The use of the electrode material of the present invention enables reduction of liquid flow pressure loss of various electrolytic cells, whereby reducing the load on a liquid delivery pump, which in turn reduces the energy consumption at operation of the pump. As a result, the total energy efficiency of the buttery can be enhanced. The electrode material of the present invention has superior shape stability and is free of slipping, dropping and deformation, which contributes to the handling property. These are advantageous particularly for redox-flow type batteries.

EXAMPLE 7

Polyacrylonitrile fiber having an average fiber size of 16 μm was made flame-resistant in the air at 200° C.–300° C. The obtained flame-resistant short fiber was felted to give a nonwoven fabric having a basis weight of 400 g/m$^2$ and a thickness of 4.0 min. The nonwoven fabric was pressed for one minute using an aluminum mold having convex mountains of width 2.0 mm, height 10 mm and distance between mountains 15 mm at 150° C., pressure 5 kg/cm$^2$ to give a flame-resistant nonwoven fabric with grooves. The obtained fabric was placed in an inert gas, the temperature of which was raised to 1250° C. at an elevating rate of 10° C./min, kept at said temperature for one hour for carbonization and cooled to give a carbonized product. This product was oxidized in the air at 650° C. to the yield by weight of 93% to give a carbonaceous fiber nonwoven fabric. The cross section of this fabric when compressed to 2 mm was examined to find the presence of semicircle gaps having the size of 0.7 mm in the thickness direction and 1.2 mm$^2$ cross-sectional area.

The electrode performance (charge-discharge cycles 2 and 100) of the obtained product was determined when set in such a manner that the groove was positioned in parallel with the electrolyte liquid flow direction on the electrode and at a spacer thickness 2.0 min. As a result, the current efficiency was 99.1% and cell resistance was 1.19 Ωcm$^2$ at cycle 2 and the current efficiency was 99.2% and cell resistance was 1.22 Ωcm$^2$ at cycle 100. The liquid flow pressure loss then between the inlet and the outlet was 7 mmHg.

EXAMPLE 8

Polyacrylonitrile fiber having an average fiber size of 16 μm was made flame-resistant in the air at 200° C.–300° C. The obtained flame-resistant short fiber was felted to give a nonwoven fabric having a basis weight of 300 g/m$^2$ and a thickness of 3.0 min. The nonwoven fabric was pressed for one minute using an aluminum mold having convex mountains of width 2.0 mm, height 10 mm and distance between mountains 15 mm at 150° C., pressure 5 kg/cm$^2$ to give a flame-resistant nonwoven fabric with grooves. The obtained fabric was placed in an inert gas, the temperature of which was raised to 1250° C. at an elevating rate of 10° C./min, kept at said temperature for one hour for carbonization and cooled to give a carbonized product. This product was oxidized in the air at 650° C. to the yield by weight of 93% to give a carbonaceous fiber nonwoven fabric. Two sheets thereof were overlapped in such a manner that the grooves in each fabric are positioned the same. The cross section of this combined fabric when compressed to 2.5 mm was examined to find the presence of a circle gap having the size of 0.5 mm in the thickness direction and 0.9 mm$^2$ cross-sectional area.

The electrode performance (charge-discharge cycles 2 and 100) of the obtained product was determined when set in such a manner that the groove was positioned in parallel with the electrolyte liquid flow direction on the electrode and at a spacer thickness 2.5 min. As a result, the current efficiency was 99.1% and cell resistance was 1.15 Ωcm$^2$ at cycle 2 and the current efficiency was 99.2% and cell resistance was 1.19 Ωcm$^2$ at cycle 100. The liquid flow pressure loss then between the inlet and the outlet was 8 mmHg.

EXAMPLE 9

Mesophase pitch fiber having an average fiber size of 13 μm was made infusible in the air at 250° C.–350° C. The obtained infusible short fiber was felted to give a nonwoven fabric having a basis weight of 350 g/m$^2$ and a thickness of 5.5 min. The nonwoven fabric was pressed for one minute using an aluminum mold having convex mountains of width 4.0 mm, height 10 mm and distance between mountains 25 mm at 180° C., pressure 5 kg/cm$^2$ to give an infusible nonwoven fabric with grooves. The obtained fabric was placed in an inert gas, the temperature of which was raised to 1300° C. at an elevating rate of 10° C./min, kept at said temperature for one hour for carbonization and cooled to give a carbonized product. This product was treated in the air at 650° C. to the yield by weight of 93% to give a carbonaceous fiber nonwoven fabric. The cross section of this fabric when compressed to 2.5 mm was examined to find the presence of semicircle gaps having the size of 0.6 mm in the thickness direction and 2.2 mm$^2$ cross-sectional area.

The electrode performance (charge-discharge cycles 2 and 100) of the obtained product was determined when set in such a manner that the groove was positioned in parallel with the electrolyte liquid flow direction on the electrode and at a spacer thickness 2.0 mm. As a result, the current efficiency was 99.1% and cell resistance was 1.19 Ωcm$^2$ at cycle 2 and the current efficiency was 99.2% and cell resistance was 1.22 Ωcm$^2$ at cycle 100. The liquid flow pressure loss then between the inlet and the outlet was 7 mmHg.

COMPARATIVE EXAMPLE 3

In the same manner as in Example 8 except that the grooves were not formed in the flame-resistant nonwoven fabric, a carbonaceous fiber nonwoven fabric was prepared. The cross section of this fabric when compressed to 2.5 mm contained no gaps.

The electrode performance (charge-discharge cycles 2 and 100) of the obtained product was determined after setting same in a spacer having a thickness of 2.5 mm. As a result, the current efficiency was 99.2% and cell resistance was 1.18 Ωcm$^2$ at cycle 2 and the current efficiency was 99.2% and cell resistance was 1.22 Ωcm$^2$ at cycle 100. The liquid flow pressure loss then between the inlet and the outlet was 14 mmHg.

The basis weight, thickness, depth of the groove, width of the groove and distance between grooves are shown in Table 2.

TABLE 2

| | performance of electrode material | | | | | properties on compression | | electrode performance | | | | liquid |
| | | | | | | | | cycle 2 | | cycle 100 | | |
| | basis weight (g/m²) | thickness (mm) | groove depth (mm) | groove width (mm) | groove distance (mm) | mode | spacer thickness (mm) | groove depth (mm) | cross-sectional area (mm²) | current efficiency (%) | cell resistance (Ωcm²) | current efficiency (%) | cell resistance (Ωcm²) | flow pressure loss (mmHg) |
|---|---|---|---|---|---|---|---|---|---|---|---|---|---|---|
| Ex. 7 | 220 | 3.4 | 2.2 | 1.7 | 14 | | 2 | 0.7 | 1.2 | 99.1 | 1.19 | 99.2 | 1.22 | 7 |
| Ex. 8 | 165 | 2.8 | 1.8 | 1.7 | 14 | two layer | 2.5 | 0.5 | 0.9 | 99.1 | 1.15 | 99.2 | 1.19 | 8 |
| Ex. 9 | 315 | 4.3 | 2.5 | 3.5 | 23 | | 2.5 | 0.6 | 2.2 | 99.1 | 1.19 | 99.2 | 1.22 | 7 |
| Com. Ex. 3 | 315 | 4.8 | — | — | — | | 2.5 | — | — | 89.2 | 1.18 | 99.2 | 1.22 | 14 |

What is claimed is:

1. An electrode material for a liquid flow-through type electrolytic cell comprising a separator interposed between a pair of collectors counter-opposing each other via a gap, and an electrode material installed in at least one of the flow paths of electrolyte solution formed between said collector and said separator, wherein the electrode material comprises a carbonaceous material sheet having at least one groove.

2. The electrode material for a liquid flow-through type electrolytic cell of claim 1, wherein the sheet is a nonwoven fabric.

3. The electrode material for a liquid flow-through type electrolytic cell of claim 1, wherein the total cross-sectional area of the electrode material is at least 1% of the product of the thickness and the width of the electrode material.

4. The electrode material for a liquid flow-through type electrolytic cell of claim 1, wherein the depth of the groove is at least 20% of the thickness of the electrode material.

5. An electrode for a liquid flow-through type electrolytic cell comprising a separator interposed between a pair of collectors counter-opposing each other via a gap, and an electrode prepared from a carbonaceous material sheet sandwiched between said collector and said separator, wherein said electrode comprises said carbonaceous material sheet having at least one groove.

6. The electrode of claim 5, wherein the electrode has at least one groove passage having a cross-sectional area in the direction perpendicular to the liquid flow path direction of 0.3–5 mm².

7. The electrode material for a liquid flow-through type electrolytic cell of claim 1, wherein the electrode material is used for a redox-flow type battery.

8. The electrode of claim 5, wherein the electrode material is used for a redox-flow type battery.

9. The electrode material for a liquid flow-through type electrolytic cell of claim 7, wherein the electrode material is used for a vanadium redox-flow type battery.

10. The electrode of claim 8, wherein the electrode material is used for a vanadium redox-flow type battery.

* * * * *